US008023670B2

(12) United States Patent
Song et al.

(10) Patent No.: US 8,023,670 B2
(45) Date of Patent: Sep. 20, 2011

(54) STRAY CAPACITANCE REDUCED CONDENSER MICROPHONE

(75) Inventors: Chung Dam Song, Seoul (KR); Chang-Won Kim, Incheon (KR)

(73) Assignee: BSE Co., Ltd., Incheon (KR)

( * ) Notice: Subject to any disclaimer, the term of this patent is extended or adjusted under 35 U.S.C. 154(b) by 6 days.

(21) Appl. No.: 12/302,676

(22) PCT Filed: Apr. 3, 2008

(86) PCT No.: PCT/KR2008/001863

§ 371 (c)(1),
(2), (4) Date: Nov. 26, 2008

(87) PCT Pub. No.: WO2009/051318

PCT Pub. Date: Apr. 23, 2009

(65) Prior Publication Data

US 2010/0290662 A1 Nov. 18, 2010

(30) Foreign Application Priority Data

Oct. 18, 2007 (KR) ........................ 10-2007-0104982

(51) Int. Cl.
*H04R 25/00* (2006.01)
*G01L 9/00* (2006.01)

(52) U.S. Cl. ......................... 381/174; 381/355; 257/419

(58) Field of Classification Search ........................ None
See application file for complete search history.

(56) References Cited

U.S. PATENT DOCUMENTS

| | | | | |
|---|---|---|---|---|
| 7,233,674 | B2 * | 6/2007 | Song | 381/174 |
| 7,327,851 | B2 * | 2/2008 | Song | 381/174 |
| 2003/0161491 | A1 * | 8/2003 | Yonehara et al. | 381/174 |
| 2006/0256984 | A1 * | 11/2006 | Song et al. | 381/174 |
| 2006/0280320 | A1 * | 12/2006 | Song et al. | 381/174 |
| 2006/0285707 | A1 * | 12/2006 | Izuchi et al. | 381/191 |
| 2007/0104339 | A1 * | 5/2007 | Izuchi et al. | 381/174 |
| 2008/0056523 | A1 * | 3/2008 | Song | 381/361 |

FOREIGN PATENT DOCUMENTS

| | | | |
|---|---|---|---|
| EP | 1257150 | A2 | 11/2002 |
| JP | 2001008293 | A * | 1/2001 |
| JP | 2005-192178 | | 7/2005 |
| JP | 2006-238441 | | 9/2006 |
| KR | 1020060112274 | | 10/2006 |
| KR | 100675022 | B1 | 1/2007 |

* cited by examiner

*Primary Examiner* — Alonzo Chambliss
(74) *Attorney, Agent, or Firm* — Ladas & Parry LLP

(57) ABSTRACT

A condenser microphone includes a conductive layer which is partially disposed on an insulation ring of a second base to reduce stray capacitance. The condenser microphone includes: a conductive case with an opened surface, wherein an end portion of the case is bent to attach to a printed circuit board (PCB); a diaphragm mounted inside the case a backplate facing the diaphragm with a predetermined distance set by a spacer; a first base made of an insulating ring to electrically insulate the backplate from the case; a second base electrically connected to the backplate by disposing a conductive layer on a portion of a ring formed of an insulating material. The PCB has a circuit component and a conductive pattern for connecting the second base, and on another surface has a conductive pattern for connecting the bent end portion of the case and a connection terminal to an external circuit.

4 Claims, 2 Drawing Sheets

Figure 3
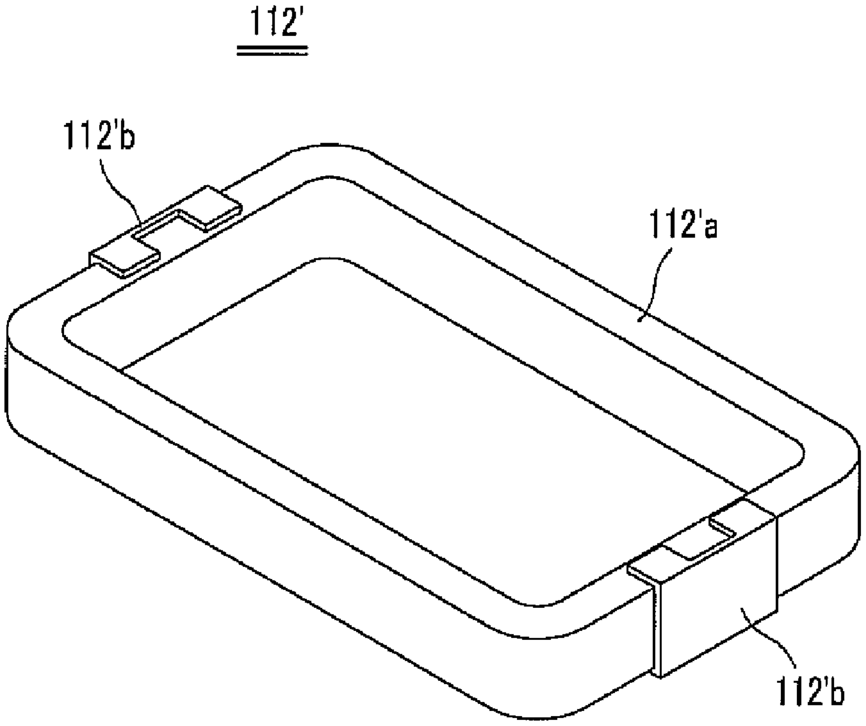
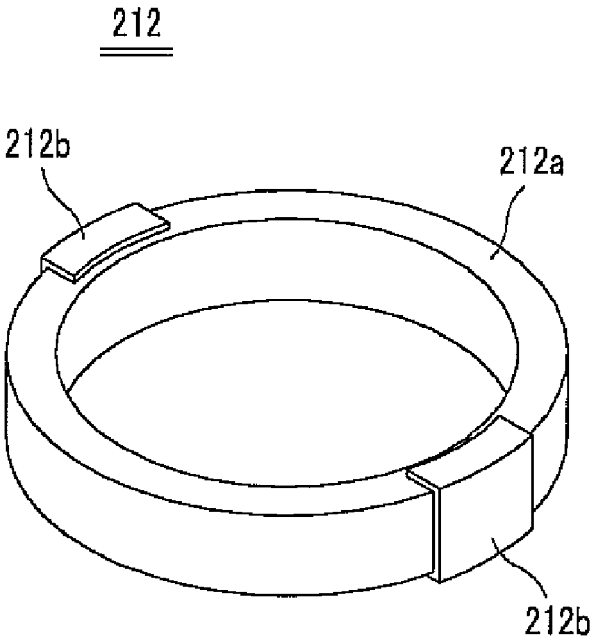
Figure 4

STRAY CAPACITANCE REDUCED CONDENSER MICROPHONE

TECHNICAL FIELD

The present invention relates to a condenser microphone, and more particularly, to a condenser microphone in which a conductive layer is partially disposed on an insulation ring of a second base made of a conventional metal ring to reduce a stray capacitance on the whole.

BACKGROUND ART

In a typical condenser microphone, a first base is formed of an insulation material to insulate a case connected to a diaphragm that is a moving electrode from a backplate that is a fixed electrode. A second base electrically connects the backplate to a printed circuit board (PCB). Thus, the second base is realized with a ring of a metal material having conductivity. Therefore, such a conventional condenser microphone has a limitation that an increased stray capacitance has a negative effect on sound quality of the microphone because the entire second base is made of the ring having the metal material.

SUMMARY

An object of the present invention is to provide a condenser microphone in which a conductive layer can be partially disposed on an insulation ring of a second base to significantly reduce a stray capacitance on the whole.

To achieve these objects and other advantages and in accordance with the purpose of the invention, as embodied and broadly described herein, there is provided a condenser microphone having a reduced stray capacitance, the condenser microphone including: a case having a box shape with an opened surface and formed of a conductive material, wherein an end portion of the case is bent during curling to closely attach to a printed circuit board (PCB); a diaphragm mounted inside the case, the diaphragm being vibrated by an external sound pressure; a spacer; a backplate facing the diaphragm with a predetermined distance by the spacer; a first base made of an insulating ring in order to electrically insulate the backplate from the case; a second base electrically connected to the backplate by disposing a conductive layer on a portion of a ring formed of an insulating material; and the PCB having one surface on which a circuit component and a conductive pattern for connecting the second base are disposed, and another surface on which a conductive pattern for connecting the bent end portion of the case and a connection terminal for connecting an external circuit are disposed. According to another aspect of the present invention, the second base may include a conductive layer connecting both surfaces of a rectangular ring formed of an insulating material on at least two or more positions or a conductive layer connecting both surfaces of a circular ring formed of an insulating material on at least two or more positions. The conductive layer may have a structure fittable in a clip shape.

According to the condenser microphone of the present invention, the conductive layer can be partially disposed on the insulating ring of the second base made of the metal ring to significantly reduce the stray capacitance on the whole, thereby improving the sound quality.

DESCRIPTION OF DRAWINGS

FIG. 3 is a perspective view of a second base according to a modified embodiment of the present invention.

FIG. 4 is a perspective view of a second base according to another embodiment of the present invention.

DETAILED DESCRIPTION OF PREFERRED EMBODIMENTS

Reference will now be made in detail to the preferred embodiments of the present invention, examples of which are illustrated in the accompanying drawings. The following embodiments are used only to explain a specific exemplary embodiment while not limiting the present invention.

Figure 1:
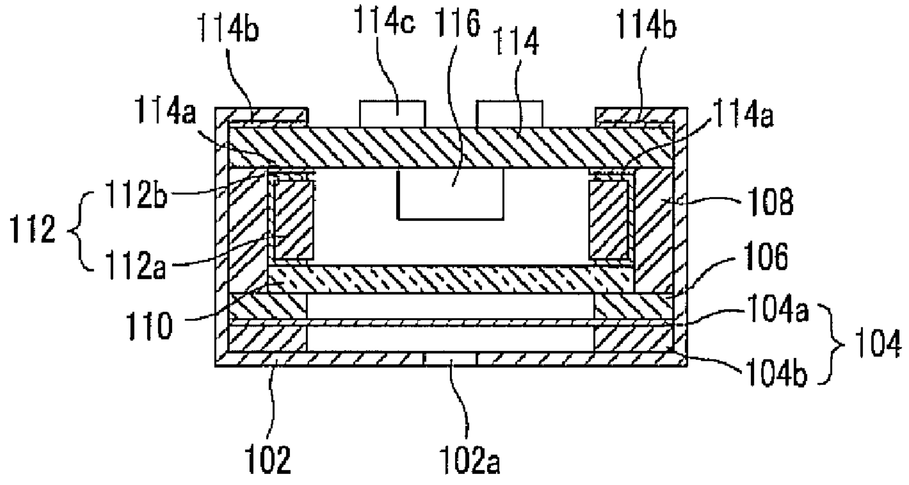
FIG. 1 is a side cross-sectional view of a condenser microphone according to the present invention.
Figure 2:
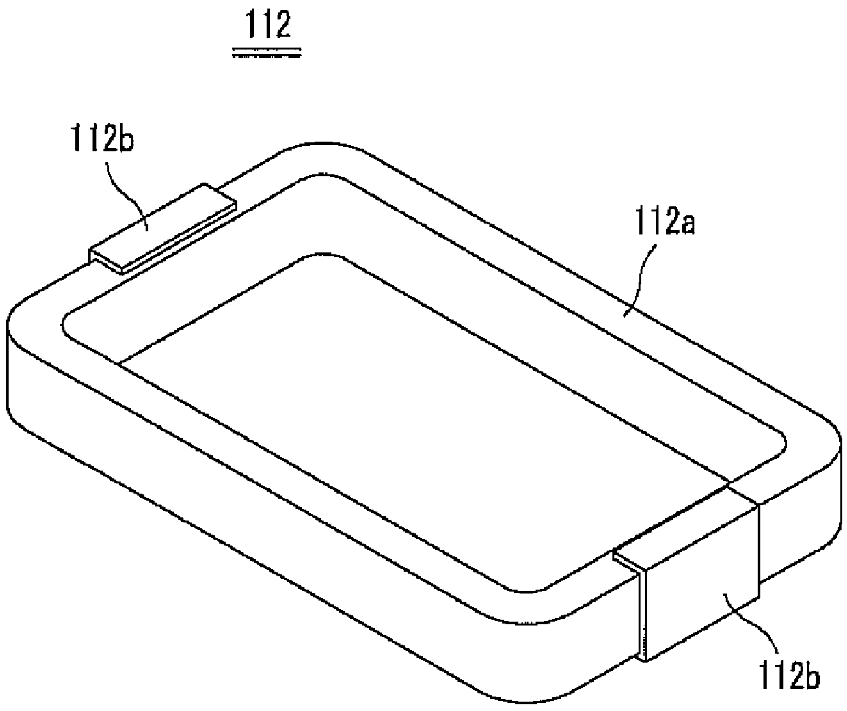
FIG. 2 is a perspective view of a second base according to an embodiment of the present invention.

FIG. 1 is a side cross-sectional view of a condenser microphone according to the present invention, FIG. 2 is a perspective view of a second base according to an embodiment of the present invention, and FIG. 3 is a perspective view illustrating a modified example of a second base according to an embodiment of the present invention.

As illustrated in FIG. 1, the condenser microphone according to the present invention includes a case 102, a diaphragm 104, a spacer 106, a first base 108, a backplate 110, a second base 112, and a PCB 114. The case 102 having a rectangular box-shape or cylindrical shape has an opened surface. The diaphragm 104 includes a polar ring 104*b* and a vibrating membrane 104*a*. The first base 108 is made of an insulating ring. The second base includes a conductive layer 112*b* on a ring 112*a* formed of an insulating material. The PCB has one surface on which a component 116 and a conductive pattern 114*a* for connecting the second base are disposed, and another surface on which a conductive pattern 114*b* is formed for connecting a curling portion of the case 102. A connection terminal 114*c* is formed on the same surface as the conductive pattern 114*b*. The connection terminal 114*c* is for connecting to an external circuit. The foregoing elements are sequentially inserted, and then, an end portion of the case 102 is bent toward the PCB to manufacture the condenser microphone.

Referring to FIG. 1, the case 102 has the one surface (hereinafter, referred to as a "bottom surface") and the other surface. The bottom surface is closed, and the other surface is opened. The case 102 has the rectangular box-shape or cylindrical shape. A sound hole 102 is defined in the bottom surface. In the diaphragm 104, the vibrating membrane 104*a* is electrically connected to the case 102 through a polar ring 104*b* formed of a conductive holding material.

An organic film (high molecular film) is adhered to a metal plate to form the backplate 110. The organic film (high molecular film) includes an electret. The backplate 110 is insulated from the case 102 through the first base 108 and connected to the PCB 114 through the second base 112.

Referring to FIG. 2, the second base 112 according to an embodiment of the present invention is manufactured by partially disposing the conductive layer 112*b* on the rectangular ring 112*a* formed of the insulating material. Referring to FIG. 3, a second base 112' according to a modified embodiment of the present invention is manufactured by fitting a rectangular ring 112'*a* into a conductive layer 112'*b* having a clip shape.

Since the second base according to the present invention has a structure that the conductive layer is added to a portion of the insulating ring using various manners, the second base can have an electrically conductive property as well as significantly reduce a stray capacitance.

Referring to FIG. 4, a second base 212 according to another embodiment of the present invention is manufactured by disposing a conductive layer 212*b* on a portion of a circular ring 212*a* formed of an insulating material. Thus, the second base reduces a generation of a stray capacitance as well as has an electrically conductive property. As described above, the second base may have various shapes such as a rectangular shape or a circular shape corresponding to a shape of the condenser microphone.

The PCB 114 has one surface on which the component 116 and a conductive pattern 114*a* for connecting the second base are disposed and the other surface on which the conductive pattern 114*b* for connecting the curling portion of the case 102 and the connection terminal 114*c* for connecting the external circuit are disposed.

The condenser microphone completely assembled according to the present invention is mounted on a main board of a product (not shown) to operate by a power source supplied from the main board.

When an external sound pressure is transmitted inside the condenser microphone through the sound hole 102*a*, the vibration membrane 104*a* is vibrated to change a capacitance between the diaphragm 104 and the backplate 110. Thus, the changed capacitance is transmitted to the circuit component 116 mounted on the PCB 114 through a path connected to the PCB 114 and a path connected to the backplate 110, the conductive layer 112*b* of the second base, and the PCB 114 via the polar ring 104*b* and the case 102. Transmitted capacitance is amplified into an electrical signal in the circuit component 116 and outputted to the main board through the connection terminal 114*c*.

It will be apparent to those skilled in the art that various modifications and variations can be made in the present invention. Thus, it is intended that the present invention covers the modifications and variations of this invention provided they come within the scope of the appended claims and their equivalents.

The invention claimed is:

1. A condenser microphone having a reduced stray capacitance, the condenser microphone comprising:

a case having an opened surface and formed of a conductive material, wherein an end portion of the case is bent during curling to closely attach to a printed circuit board (PCB);

a diaphragm mounted inside the case, the diaphragm for being vibrated by an external sound pressure;

a spacer;

a backplate facing the diaphragm with a predetermined distance set by the spacer;

a first base made of an insulating ring to electrically insulate the backplate from the case;

a second base electrically connected to the backplate by disposing a conductive layer on a portion of a ring formed of an insulating material; and the PCB having one surface on which a circuit component and a conductive pattern for connecting the second base are disposed and another surface on which a conductive pattern for connecting the bent end portion of the case and a connection terminal for connecting an external circuit are disposed.

2. The condenser microphone of claim 1, wherein the second base includes a conductive layer connecting to top and bottom surfaces of a rectangular ring formed of an insulating material and on at least two or more positions on the ring.

3. The condenser microphone of claim 2, wherein the conductive layer has a structure fittable in a clip shape.

4. The condenser microphone of claim 1, wherein the second base includes a conductive layer connecting to top and bottom surfaces of a circular ring formed of an insulating material and on at least two or more positions on the ring.

* * * * *